(12) United States Patent
von Bülow et al.

(10) Patent No.: US 11,333,124 B2
(45) Date of Patent: May 17, 2022

(54) WAVE POWER DEVICE

(71) Applicant: Wavepiston A/S, Helsingør (DK)

(72) Inventors: Martin von Bülow, Helsingør (DK); Kristian Glejbøl, Glostrup (DK); Claus Schmidt Møller, Fredensborg (DK)

(73) Assignee: Wavepiston A/S, Helsingør (DK)

( * ) Notice: Subject to any disclaimer, the term of this patent is extended or adjusted under 35 U.S.C. 154(b) by 382 days.

(21) Appl. No.: 16/468,449

(22) PCT Filed: Dec. 13, 2017

(86) PCT No.: PCT/DK2017/050430
§ 371 (c)(1),
(2) Date: Jun. 11, 2019

(87) PCT Pub. No.: WO2018/108220
PCT Pub. Date: Jun. 21, 2018

(65) Prior Publication Data
US 2020/0088155 A1  Mar. 19, 2020

(51) Int. Cl.
*F03B 13/22* (2006.01)
*F03B 13/18* (2006.01)

(52) U.S. Cl.
CPC .............. *F03B 13/22* (2013.01); *F03B 13/18* (2013.01); *F03B 13/185* (2013.01); *F03B 13/187* (2013.01); *F03B 13/1875* (2013.01); *F05B 2260/406* (2013.01); *Y02E 10/30* (2013.01)

(58) Field of Classification Search
CPC .......................... F03B 13/185; F03B 13/1875
USPC ........ 60/495–507; 290/42, 53; 417/100, 330
See application file for complete search history.

(56) References Cited

U.S. PATENT DOCUMENTS

| | | | |
|---|---|---|---|
| 870,706 | A | 11/1907 | Woodard |
| 875,950 | A | 1/1908 | Reynolds |
| 3,417,670 | A | 12/1968 | Madland |
| 4,698,969 | A | 10/1987 | Raichlen et al. |
| 4,931,662 | A | 6/1990 | Burton |
| 8,484,965 | B2 | 7/2013 | Von Bulow et al. |

(Continued)

FOREIGN PATENT DOCUMENTS

| CN | 101624960 A | 1/2010 |
|---|---|---|
| EP | 1045138 A2 | 10/2000 |

(Continued)

OTHER PUBLICATIONS

International Search Report; European Patent Office; International Application No. PCT/DK2017/050430; dated Apr. 5, 2018; 3 pages.

(Continued)

*Primary Examiner* — Mark A Laurenzi
*Assistant Examiner* — Mickey H France
(74) *Attorney, Agent, or Firm* — Taft Stettinius & Hollister LLP (57) ABSTRACT

The present invention relates to a wave power device for extracting energy from water waves. The waver power device comprise a reference structure and effectors moving relative to the reference structure. The effectors are connected to two hydraulic rams, symmetrically positioned around each effector. The hydraulic rams have an effective hydraulic area which is stepwise increased as the length of the hydraulic rams are compressed and stepwise increased as the length of the hydraulic rams are increased.

20 Claims, 8 Drawing Sheets

(56) References Cited

U.S. PATENT DOCUMENTS

| | | | | |
|---|---|---|---|---|
| 2009/0284014 | A1* | 11/2009 | Sieber | F04B 35/004 |
| | | | | 290/53 |
| 2010/0308589 | A1 | 12/2010 | Rohrer | |
| 2010/0308590 | A1 | 12/2010 | Rohrer | |
| 2011/0204643 | A1* | 8/2011 | Von Bulow | F03B 13/185 |
| | | | | 290/53 |
| 2012/0212350 | A1* | 8/2012 | Magnell | F03B 13/10 |
| | | | | 340/850 |
| 2016/0333847 | A1 | 11/2016 | Gregory | |

FOREIGN PATENT DOCUMENTS

| | | |
|---|---|---|
| GB | 1591727 A | 6/1981 |
| JP | S62-18376 U | 2/1987 |
| JP | H01-238704 A | 9/1989 |
| JP | 2012-503131 A | 2/2012 |
| WO | 9817911 A1 | 4/1998 |
| WO | 2010031405 A2 | 3/2010 |
| WO | 2016022315 A1 | 2/2016 |

OTHER PUBLICATIONS

Written Opinion of the International Searching Authority; European Patent Office; International Application No. PCT/DK2017/050430; dated Apr. 5, 2018; 6 pages.

International Preliminary Report on Patentability; The International Bureau of WIPO; International Application No. PCT/DK2017/050430; dated Jun. 18, 2019; 7 pages.

Notice of Reason for Refusal, Japan Patent Office, Japanese Patent Application No. 2019-552333, dated Aug. 3, 2021, 5 pages.

* cited by examiner

WAVE POWER DEVICE

FIELD OF THE INVENTION

The invention relates to wave power devices for extracting energy from water surface waves, in particular in waters such as oceans, lakes or any other waters where water surface waves are generated by wind or other environmental influences.

The invention also relates to a wave power system comprising a wave power device as well as a method of extracting power from water waves.

BACKGROUND OF THE INVENTION

For many years, there has been high focus on environment friendly methods for generating energy, in particular by extracting energy from wind and water waves. Contrary to popular belief, water movement resulting from waves is not a vertical movement, but rather a circular movement comprising a horizontal, as well as a vertical component. Thus, a submerged vertical plate and a submerged horizontal plate are subjected to forces of similar magnitude, and are thus equally suited to extract energy from waves.

Most of the prior art systems and methods for generating energy from water waves are based on methods for utilizing the vertical motion of water waves i.e. the systems are equipped with floating effectors utilizing the difference of height between the crest and trough of the waves.

For example U.S. Pat. No. 870,706 describes a device comprising a number of floating effectors which move up and down, driven by the variations of the water surface level and this motion is used to drive a motor.

A similar system which is used as a water pump is disclosed in EP 1 045 138 in the form of a plant for pumping water. The plant comprises a floating effector that drives the working of a cylinder/piston system with two counteracting suction/force chambers, each fitted with a suction pipe that draws water from the sea and a delivery pipe that discharges the pumped water to the consumer. Other examples are disclosed in both U.S. Pat. Nos. 4,698,969 and 4,931,662, which both comprise devices with one or more floating effectors, which are moving with the waves between their crest and trough and thereby extracting energy.

The prior art also comprises prior art systems where the horizontal component of the wave's energy is utilized for extraction of energy.

An example can be found in U.S. Pat. No. 875,950, where a number of effectors are forced back and forth because of the horizontal component in the circulating wave motion. The effectors according to U.S. Pat. No. 875,950 do not oscillate freely, as the motion is dampened by one or more hydraulic rams, which force seawater under pressure into a collector pipe due to the forced motion of the effectors. This collector pipe is lead to a turbine station where the pressurized seawater is used to power a turbine.

A further example where the horizontal component of the waves is used is described in WO 98/17911 that describes an electric marine generator comprising an oscillating sluice-valve with an effector in the form of a plane rectangular surface vertically arranged in front of the waves for extracting energy. The effector is anchored with hinges at the bottom of the sea.

Furthermore, U.S. Pat. No. 8,484,965 describes a device for converting ocean wave energy, using the horizontal component of wave motions. The device comprises at least one oblong supporting structure and three or more independently movable effector modules, each carrying an effector, which is forced back and forth by the action of waves. A power take-off system, attached both to the supporting structure and to the effector is energized by the movement of the effector relative to the supporting structure, hereby producing useful energy, which can be either a pressurized fluid, a mixture of pressurized fluids or electrical power.

The effector as described in U.S. Pat. No. 8,484,965 do only have limited travel length, the travel length being largely defined by the maximum stroke of the power take-off system. The maximum stroke length of the power takeoff-system is a compromise between necessity and economy. For optimal performance, the maximum stroke should be larger than the largest stroke expected during operation. However, the longer stroke length the heavier and costlier the system will be. Hence, stroke length will always be a compromise between cost and practicality.

When using devices for extracting energy from the horizontal component of the wave movement, drift of the effectors present a technical problem. Irregular waves are not symmetric, hence drift, i.e. successive movement of the effector from its center position towards one of its extreme positions will happen during operation. This is a major technological problem, as an effector already offset towards one end of its maximum travel distance, can only travel a short further distance before hitting the end of the travel length. Upon hitting its maximum travel length, energy production ceases. Furthermore, when the free travel of the effector is blocked, large forces may build up on the effector due to the discontinued flow of the moving wave.

Until now, the only known solution to make a self-centering system has been to mount the moving effectors with mechanical springs that force them towards the center position, during periods when there is no wave loads on the system. This system is, however both tedious and costly to implement, as it require that the structure, in addition to carry wave forces, also have to cope with the internal forces caused by the activated return springs. Furthermore, the installed springs are installed in a marine environment containing high level of chloride and will be subjected to millions of load cycles, which makes them prone to fatigue failure. Thus, there is an urgent technological need for a simple and easy to implement method that makes the effectors self-centering, hereby ensuring that energy production is optimal, and that the system avoids large loads due to un-wanted stopping forces.

OBJECT OF THE INVENTION

The object of the invention is to present a wave power device that can extract energy from the horizontal component of water waves, where the power take-off system have a high margin against damage in high waves, because the effectors are self-centering which reduces the probability of the effectors to be forced towards positions beyond their design limit.

SUMMARY OF THE INVENTION

In one aspect, the present invention relates to a wave power device for extracting energy from water waves, the wave power device comprising:
- a substantially stationary member
- an effector being directly or indirectly connected to the substantially stationary member and being configured for moving relative to the substantially stationary member when wave forces are acting on the effector, wherein the effector is configured to move parallel to a length axis of the substantially stationary member, from a predetermined center position on the substantially stationary member, in either one of two directions being opposite to each other, the wave power device further comprises at least two hydraulic rams preferably being symmetrically arranged around each effector 11 along the length axis of the substantially stationary member 2, wherein the at least two hydraulic rams each comprise:

a base section, at least one pipe section and a center section, wherein the center section is configured for sliding into and out of a pipe section and a pipe section is configured for sliding into and out of the base section, wherein the sections together enclose a sealed space, having a volume which are decreasing or increasing when the sections slide into and out of each other respectively, an inlet comprising a valve, for inletting water into the enclosed space within the hydraulic ram when the length of the hydraulic ram is increasing, an outlet comprising a valve, configured for outletting pressurized water from the enclosed space within the hydraulic ram when the length of the hydraulic ram is decreasing, preferably into a pressure pipe, wherein the base section or the center section are fixed at a pre-determined position on the substantially stationary member and the other is directly or indirectly connected to the effector, in a way so when the effector moves relative to the substantially stationary member:

the effective hydraulic area of at least one of the at least two hydraulic rams is stepwise increased as the moving effector decreases the length of that hydraulic ram and the effective hydraulic area of at least one of the at least two hydraulic rams is stepwise decreased as the moving effector increases the length of that hydraulic ram.

Substantially Stationary Member:

The substantially stationary member may be as described in WO 2010/031405. The substantially stationary member is preferably substantially straight, however it could be more or less curved provided that the effectors are mounted such that they can move along the length axis of the substantially stationary member in at least a distance. In certain operational conditions e.g. strong cross currents, the substantially stationary member may attain a slightly curved shape.

The term "substantially stationary member" means that the member in use is mounted to remain substantially stationary when the plurality of effectors moves relatively thereto along the length axis of the substantially stationary member. The length axis of the substantially stationary member means along an axis substantially parallel with the length of the substantially stationary member.

The substantially stationary member has mainly the purpose to provide the wave power device with a reference structure. The substantially stationary member is therefore in one embodiment substantially rigid. In one embodiment, the substantially stationary member is slightly bendable and/or it may be stretchable/collapsible in length e.g. by having accordion folding. In one embodiment, the substantially stationary member is provided in modules which can be mechanically connected before deployment. In an equally preferred embodiment, the substantially stationary member is made from one or a few members which are foldable or spoolable for easy transportation.

In some embodiments, the substantially stationary member is arranged horizontally in the water, in a way so the effector moves along a horizontal length axis, when wave forces are acting on it. In some embodiments, the substantially stationary member is a pipe, such as a pressure pipe or a steel cable.

In some embodiments, the substantially stationary member is kept flowing in the water, by at least two buoys, preferably arranged in each end of the substantially stationary member. In some embodiments the substantially stationary member is kept stationary by at least two mooring chains, preferably arranged in each end of the substantially stationary member, wherein each mooring chain is either connected to an anchor or fastened to the bottom surface below the substantially stationery member or fastened to the shore. However, the substantially stationary member may be kept stationary in the water, by any means a skilled person could think of.

Effector:

The effector according to the present invention, may be as described in the prior art U.S. Pat. No. 875,950, WO 98/17911 and WO 2010/031405 and are constrained to move along the length axis of the substantially stationary member. The effectors are substantially vertical and will thus predominantly be affected by the horizontal component of the water movement due to waves. It is desired that the effectors are to be arranged substantially symmetrical with a symmetry plane perpendicular to the length axis of the substantially stationary member. By arranging the effectors in this way, the torque exerted by the effector on the stationary member is minimized, which contributes to keep the stationary structure light and inexpensive. In some embodiments, the effector is a plate being vertically positioned in the water, perpendicular to the length axis of the substantially stationary member.

In preferred embodiments, the wave power device comprise a plurality of effectors. The wave power device, in principle, may have as many effectors as desired. Generally, it is desired to select the number of effectors and the arrangement of the effectors such that the summed-up force applied to the whole wave power device is kept relatively low. By arranging three or more effectors so that, when the wave power device is in use, the mutually oscillating force exerted by the effectors will be out of phase with each other. Therefore it is possible to keep the summed-up force which affect the mooring low.

With the option of varying the resistance surface area of one or more effectors, the summed-up forces are subjected to an additional control for avoiding damaging forces or unduly wear. When selecting the number of effectors, the available space for the wave power device should be considered, since the effector elements may be less effective if they are arranged too closely to each other.

However, based on the teaching herein and the general knowledge about waves the skilled person will be able to select a number which will work for a given application. In one embodiment, the wave power device comprises at least 3 effectors, such as at least 6 effectors, such as at least 10 effectors, such as at least 12 effectors, such as at least 24 effectors. In some embodiments, the effector is being penetrated by the substantially stationary member, preferably in the center of the effector. Thus, the effector may comprise a hole configured for being penetrated by the substantially stationary member.

In some embodiments, the effector is further connected to means for stabilizing and easing the movement of the effector, such as an effector-frame and wheels adapted to run on the substantially stationary member, in a way so the effector moves smoothly along a length axis of the substantially stationary member, when wave forces are acting on it. In some embodiments, one effector and the effector frame is mounted on an effector-module connected to the substantially stationary member.

Each effector is configured to have a maximum travelling length along the length axis of the substantially stationary member, which may be determined by the stroke length of the at least two hydraulic rams symmetrically positioned around the effector and the level of compression of the at least two symmetrical hydraulic rams, when the effector is in its center position. In some embodiments, the maximum travelling length of the effector, is that of the length of at least one of the at least two hydraulic rams, when that hydraulic ram is fully extended, minus the length of the base section of that hydraulic ram. Depending on the design of the system, the effectors may have the same or different maximal travelling distances. The fact that the effectors have a maximal travelling lenght along the length axis of the substantially stationary member should be interpreted such, that the respective effectors can be moved the maximal travelling lenght provided that it is provided with the required amount of force. However, the actual travel length during operation depends on the actual wave conditions and the effectors need not to be moved the full length of the maximal travelling lenght to produce pressurized water.

For optimal use it is desired that the maximal travelling distance for at least two of the effectors, such as at least about half of the effectors, such as substantially all of the resistance elements is at least about 1 m, such as at least about 5 m such as at least about 10 m. However, in principle the maximal travelling lenght has no upper limit. If the maximal travelling lenght is very high, it may merely add to cost without resulting in an increase of extracted energy.

Hydraulic Rams:

Any combination of hydraulic rams with varying cross section fall within the boundaries of this invention. In preferred embodiments, the effector is directly or indirectly symmetricly connected to N*2, N ∈ [1,2,3,4,5] hydraulic rams, such that the effector is self-centering and such that the load on the effector is symmetric around its center, preferably when the effector is in its center position e.g in a equilibrium position. In preferred embodiments, the at least two hydraulic rams are partly compressed when the effector is in its center position and the force required to move the effector in one direction is the same as the force required to move the effector in the opposite direction. In some embodiments, the at least two hydraulic rams are compressed to an extend so their length is half of their full length when the effector is in its center position.

Hydraulic rams comprise a a base section, at least one pipe section and a center section. In some embodiments, the base section, the at least one pipe section and the center section are cylinders. The term cylinder is here used as a generic term and is not limited entities with a circular cross-section. Hence, in this context cylinders can have any cross sections, including elliptical, and multifaceted, including, triangular, square and hexagon shapes.

The base section and the center section each have one open end and one closed end, whereas the at least one pipe section have two open ends. The center section may also be a solid rod of metal, or any other shape which fits into the pipe section with the smallest clearance in the assembly of the hydraulic ram.

In some embodiments, the at least two hydraulic rams comprise more than one pipe section, such as two, three, four, five, six, seven, eight, nine or ten pipe sections. The number of pipe sections included in a hydraulic ram preferably varies from 1 and up to 10 for practical reasons, although a hydraulic ram could, theoretically comprise any number of pipe sections. In some embodiments, the at least two hydraulic rams are telescopic hydraulic rams.

Mechanical connection of the hydraulic ram to the substantially stationary member, may be made through one or more coupling points, arranged on the base section or the center section of the hydraulic ram. The effectors and the stationary member may interact partly or fully through the hydraulic rams. In some embodiments, one end of a hydraulic ram is mechanically fixed to a certain point along the length axis of the stationary member, whereas the position of the other end, which is directly or indirectly connected to the effector, is determined by the position of the effector. A bracket may be used to fix the hydraulic ram to the substantially stationary member.

When the sections slide into each other, the length of, and the volume inside, the hydraulic ram decreases. This happen during compression of a hydraulic ram.

When the sections slide out of each other, the length of, and the volume inside, the hydraulic ram increases. This happen during extension of a hydraulic ram.

Upon compression of a hydraulic ram, the section with the smallest hydraulic cross section e.g the center section is first activated and remains active until it is fully compressed. Hereafter the second smallest section, e.g a pipe section compresses and so on, until the hydraulic ram is fully compressed. If the hydraulic ram acts against a constant pressure, the effect of this activation sequence is that the reaction force produced by the hydraulic ram is gradually growing through the compression sequence.

When the hydraulic ram is fully extended and a compressive force is acting along the center axis on the center section, the force will be transferred from the center section into the fluid in the hydraulic ram, resulting in that pressure will build up inside the hydraulic ram. If the pressure in the hydraulic ram exceeds the ejection pressure, the center section will start to travel into the smallest pipe of the assembly. When the center section is fully compressed into the smallest pipe, the assembly comprising the center section and the smallest pipe will start to travel into the next pipe of the assembly. If the pressure in the hydraulic cylinder is constant, this will require an increased force, since the hydraulic area of the center section+first pipe hydraulic area is larger than the area for only the center section. In this way, the effective hydraulic area of the hydraulic ram stepwise increases as it undergoes compression. This feature is utilized in this invention to ensure that the force exerted by the hydraulic ram grows as the hydraulic ram is compressed, i.e. the effector is forced towards one end.

If a hydraulic ram is fully compressed and a tensile force applied along the center axis the ram will expand. In the general case the expansion sequence will be much less well defined compared to the compression sequence, as friction in the seals and the differential pressure between the hydraulic fluid of the ram and ambient will determine the expansion sequence.

In some embodiments, more than two hydraulic rams are arranged around each effector, such as two, three, four, five, six, seven, eight, nine or ten hydraulic rams. In that way, the force required to compress or extend the hydraulic rams may be increased without changing the size of the hydraulic rams.

The number and total volume of a hydraulic ram, directly or indirectly connected to each effector, depends very much on local sea conditions. If the waters are very shallow, the circular movement of the water particles are superimposed with a drift towards shore. Under such conditions a sensible arrangement of hydraulic rams would be such that the force required to move the hydraulic rams towards shore is larger than that required to move it in the opposite direction. For example if an a number of hydraulic rams are arranged on a first side of an effector, such as two hydraulic rams, and another number of hydraulic rams are arranged on the second side of an effector, such as three hydraulic rams, the force required to compress the three hydraulic rams is larger than the force required to compress the two hydraulic rams. Such a configuration may be advantageous in waters, with a predominant direction of the water particles, e.g. in waves close to a shore.

Sealing and Locking Means:

A hydraulic ram may further comprise sealing means and/or locking means. In some embodiments, the sections of each hydraulic ram comprise sealing means, to ensure that no water is let into or out of the hydraulic ram by other means than through the inlet and outlet respectively.

In some embodiments, the stepwise decrease and/or increase of the effective hydraulic area of each hydraulic ram, is being controlled by locking means, such as magnetic locking means or mechanical locking means or hydraulic locking means or a combination thereof.

The hydraulic rams may be fitted with locking means ensuring that compression and/or the expansion of the hydraulic ram is programmed such that the highest available area always is always active during expansion. Means for this controlled expansion encompass, but is not limited to, controlled friction, mechanical locking, electromechanical locking, electromagnetic locking, magnetic locking or hydraulic means.

In a preferred embodiment, the locking means are magnetic couplings, where the strongest coupling is between the center section and the smallest pipe of the hydraulic assembly. Furthermore, the next-strongest magnetic coupling is between the first pipe element and the second pipe element and so on and so forth. In an equally preferred embodiment, the locking means are mechanical locks, either of varying strengths or geometrically interlocked such that the correct release sequence is ensured. In an equally preferred embodiment, the locking means are based on forced caused by pressure difference between sealed volumes in the hydraulic ram assembly. The locking strategy can apply to any number of pipe sections, preferably all pipe sections in the hydraulic ram. All pipe sections may be locked using the same locking strategy, or different locking strategies may be employed on the same hydraulic ram.

The at least two hydraulic rams are configured for producing pressurized water being pushed through the outlet comprising the valve and into the pressure pipe, when the effector moves. In some embodiments, the outlet of each hydraulic rams is fluidly connected to a pressure pipe, configured for receiving pressurized water when the effectors move. In some embodiments, the pressure pipe is connected to the outlet of a number of hydraulic rams, such as all of the hydraulic rams. In some embodiments, the pressure pipe is connected to a turbine that can convert the pressurized water into energy, such as electric energy. In some embodiments the pressure pipe is connected to a reverse osmosis fiter, thus producing sweet water from the pressurized water. The pressure pipe may penetrate the effector.

The present invention further relates to a method for extracting energy from water waves, using the wave power device described herein.

The present invention further relates to a system for extracting energy from water waves, comprising the wave power device described herein.

The wave power device of the invention provides a new method of extracting large amounts of energy from water waves, while minimizing or avoiding unintended loads on the device due to stopping forces, hereby ensuring a long duration of the used device. Furthermore, the system makes the use of return springs obsolete, hereby removing the need for return springs as well as the structure necessary to support these springs.

Until the present invention, an obstacle to using the horizontal component of water waves for generating energy has been drift of the effector due the highly varying horizontal forces implied by irregular waves. Heretofore, wave power devices using the horizontal component of water waves for generating energy were designed with passive springs to forcing the effector into center positon, said springs adding substantial cost and complexity as well as increased risk of failure to the system. Due to the present invention, it is now possible to get rid of the return springs, hereby making the system lighter, cheaper and at the same time more robust against fatigue failure. Furthermore, because the power take off system according to the invention exerts a force on the effectors, which depends on the effector position, the invention allows for more effective harvesting of energy in small waves.

It should be understood that the detailed description and specific examples are given by way of illustration only, since various changes and modifications within the spirit and scope of the invention will become apparent to those skilled in the art from this detailed description.

BRIEF DESCRIPTION OF THE FIGURES

The wave power device according to embodiments of the present invention will now be described in more detail with regard to the accompanying figures. The figures are not to be construed as being limiting to other possible embodiments falling within the scope of the attached claim set.

DETAILED DESCRIPTION OF EMBODIMENTS OF THE INVENTION

Figure 1:
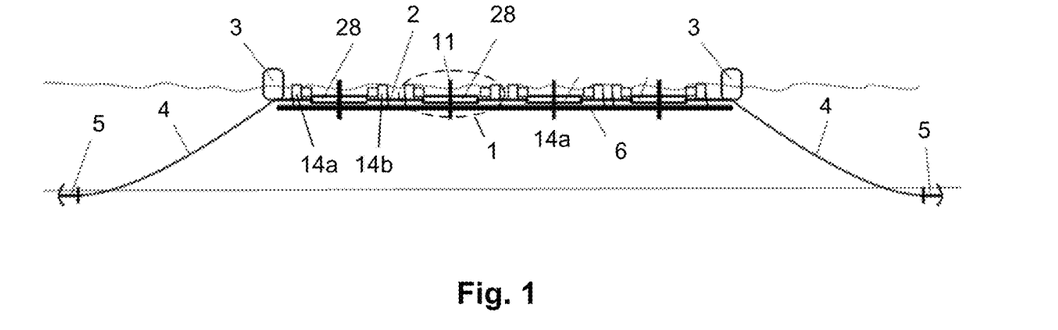
FIG. 1 schematically illustrates an overview of a wave power device according to an embodiment of the present invention, FIG. 2 schematically illustrates a top view of a wave farm comprising multiple substantially stationary members 2 and a plurality of effectors 11, FIG. 3 schematically illustrates a wave power device according to a preferred embodiment of the present invention, FIG. 4 schematically illustrates a side view of a disassembled (FIG. 4a) and an assembled (FIG. 4b) hydraulic ram according to an embodiment of the present invention, FIG. 5 schematically illustrates different embodiments of the configuration of the inlet and outlet on a hydraulic ram, FIG. 6 schematically illustrates an assembled fully extended hydraulic ram as well as different partly compressed stages (b, c, d, e) of the fully extended hydraulic ram according to an embodiments of the present invention, FIG. 7 schematically illustrates a three-dimensional view of a fully extended hydraulic ram according to different embodiments of the present invention, FIG. 8 schematically illustrates a three-dimensional view of an effector according to different embodiments of the present invention, FIG. 9 schematically illustrates different embodiments of locking means which may be used with a hydraulic ram according to the present invention, FIG. 10 schematically illustrates a wave power device according to the present invention, where the hydraulic rams are in different positions of compression, FIG. 11 schematically illustrates different configurations of the effector and the hydraulic rams relative to the substantially stationary member of a wave power device according to the present invention, FIG. 12 schematically illustrates two embodiments of a wave power device according to the present invention, wherein the effector is connected to means 28 for stabilizing and easing the movement of the effector and FIG. 13 schematically illustrates an embodiment of a wave power device according to the present invention, where the one effector is directly (13a) or indirectly (13b) connected to two substantially stationary members.

FIG. 1 shows a schematic overview of a wave power device according to an embodiment of the present invention. The substantially stationary member is held stationary in the water by two buoys 3, two mooring chains 4 and two anchors 5. The substantially stationary member 2 is mounted with four effector modules 1, each comprising an effector 11, means 28 for stabilizing and easing the movement of the effector along the length axis of the substantially stationary member 2 and two hydraulic rams 14a, 14b, symmetrically arranged around each effector.

The effector 11 is a plate-like structure, which is pushed back and forth by the oscillating action of the wave movement. Besides of forces pushing the effector back and forth, the effector will also experience non-symmetric loads due to non-uniformities in the wave movement. To handle the non-symmetric loads the effector 11 may be mounted on an effector-frame 28a, including wheels 28c that run on the substantially stationary member 2 (See FIG. 3 for details). To extract useful energy from the movement of the effector, each end of the effectors is directly or indirectly coupled to on end of a hydraulic ram 14, which itself is fixed to the substantially stationary member 2 in the opposite end.

In operation, the effectors 11 are forced back and forth and the force exerted on these will be transferred to the hydraulic rams on the stationary structure. When the effectors are moving along the length axis of the stationary structure, one hydraulic ram is compressed, while another is extended. During compression of a hydraulic ram, pressurized water is generated within that hydraulic ram 14, which is transferred from an outlet 24 in each hydraulic ram 14, to a pressure pipe 6 and feed to a turbine not included in the sketch, which can convert the pressurized water to energy, such as electrical energy.

When installing the system, first each chain 4 is attached to an anchor 5 in the one end, and a buoy in the other, where after the anchors are deployed. Hereafter the substantially stationary member 2 is strung between the buoys 3 and tensioned, making the assembly substantially fixed in position. Then a pressure pipe 6 is attached to the structure, making it ready for mounting on the effector modules by being connected to the outlet of each of the hydraulic rams 14. After having secured the substantially stationary member 2, the effector modules are attached. Under some operational conditions, the mounting strategy might be cumbersome, as replacement of the effector module will require, not only de-attachment of the effector-frame 28a, but also de-attachment of the hydraulic rams 14 from their mounting points. To ensure simpler replacement and repair of effector modules, it is sometimes convenient to mount both effector 11, effector-frame 28a and hydraulic rams 14 on a module 1, making mounting and detachment simple and efficient.

Figure 2:
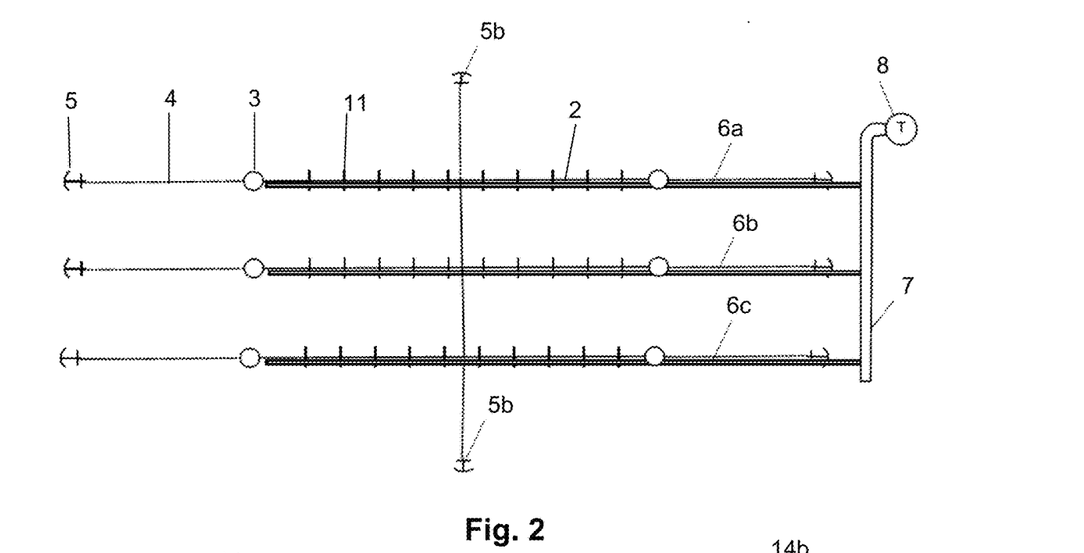

FIG. 2 illustrates a top view of a wave farm comprising multiple substantially stationary members 2 with a plurality of effectors 11 acting along each substantially stationary member. The pressure pipes 6a, 6b, 6c all feed to the same manifold pressure pipe 7 which collect the streams of pressurized water and conveys it to a turbine 8. In the figure is shown optional ancillary anchors 5b for handling cross-currents, when local sea conditions or other operating conditions dictate it.

Figure 3:
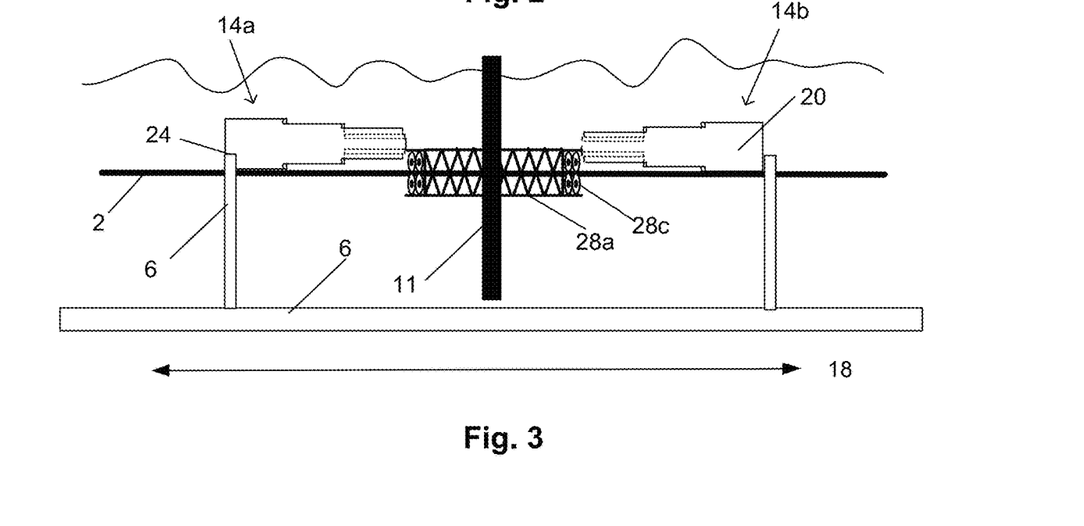

Reference is made to FIG. 3 illustrating a wave power device comprising a substantially stationary member 2 and an effector 11 plate being penetrated by the substantially stationary member 2. The effector 11 plate is configured for moving relative to the substantially stationary member 2 when wave forces are acting on the effector 11. More specifically, the effector 11 is configured to move parallel to a length axis 18 of the substantially stationary member, from a predetermined center position 19 on the substantially stationary member 2, in either one of two directions being opposite to each other.

The wave power device further comprises two hydraulic rams 14a, 14b, being symmetrically arranged around the effector 11 along the length axis 18 of the substantially stationary member 2.

The two hydraulic rams 14a, 14b in FIG. 3 each comprise five sections: one a base section 144, three pipe sections 143a, 143b, 143c and a center section 142. The two hydraulic rams 14a, 14b each further comprise an inlet 21 comprising a valve 22, for inletting water into the enclosed space 20 within the hydraulic ram 14a, 14b, when the length 23 of the hydraulic ram 14a, 14b is increasing (inlet and valve not shown in figure). The two hydraulic rams 14a, 14b each further comprise an outlet 24 comprising a valve 25, configured for outletting pressurized water from the enclosed space 20 within the hydraulic ram 14 when the length 23 of the hydraulic ram 14a, 14b is decreasing (valve not shown in figure).

The base section 144 of the hydraulic rams are fixed at a pre-determined position 26 on the substantially stationary member 2 and the center section 142 is indirectly connected to the effector 11 plate through an effector frame 28a comprising wheels 28c. The function of the effector frame 28a is to stabilize the effector 11 and the function of the wheels 28c is to ease the movement of the effector along the substantially stationary member 2. The two hydraulic rams 14 are compressed to an extend so their length 23 is half of their full length minus the length of the base section 144 and the effector is in its center position 19.

Thus, the force required to move the effector 11 in one direction is the same as the force required to move the effector 11 in the opposite direction. When wave forces are acting on the effector 11, the effector 11 moves relative to the substantially stationary member.

Figure 4A:
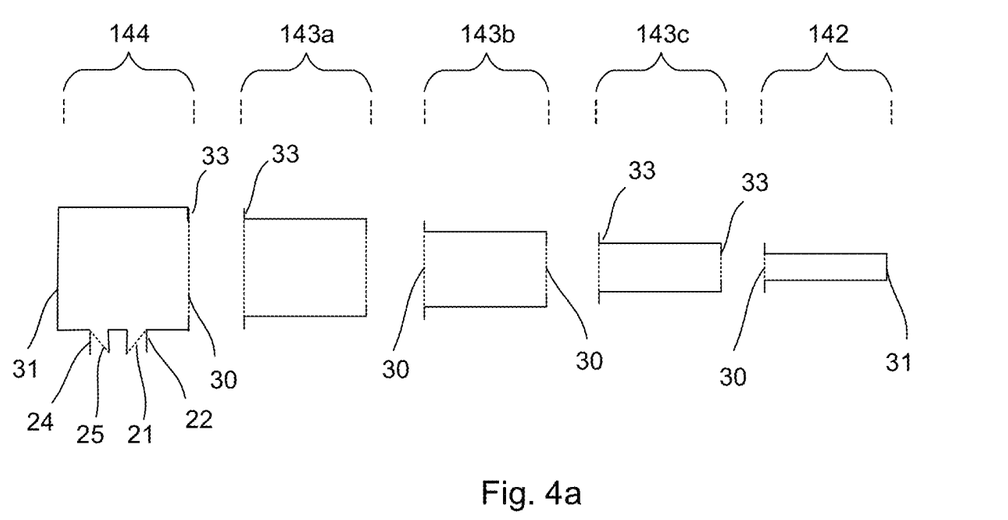
Figure 4B:
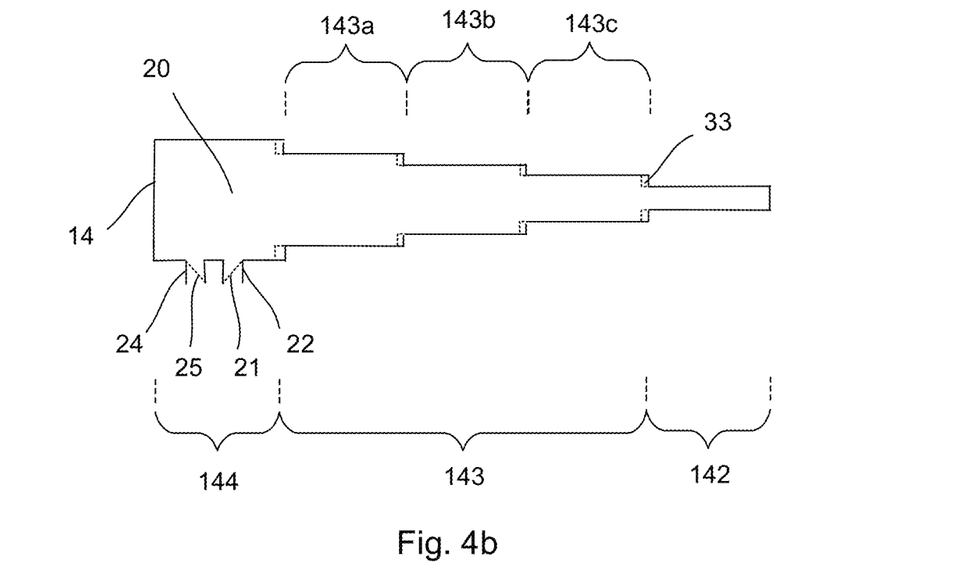

FIG. 4 schematically illustrates a side view of a disassembled (FIG. 4a) and an assembled (FIG. 4b) hydraulic ram 14 according to an embodiment of the present invention.

A hydraulic ram 14 according to the present invention comprise at least three sections including one base section 144, one pipe section 143 and one center section 142. The hydraulic ram 14 may comprise more than one pipe section 143, such as between two or ten pipe sections. In theory, a hydraulic ram 14 according to the present invention may comprise more than ten pipe sections 143. When the hydraulic ram comprise more than one pipe section 143, the largest pipe section is referred to as the first pipe section 143a, the second largest pipe section is referred to as the second pipe section 143b and so on.

The disassembled hydraulic ram 14 in FIG. 4a comprise five sections 144, 143, 142: one base section 144, three pipe sections 143a, 143b, 143c and one center section 142. The base section 144 have one closed end 31 and one open end 30 (indicated by dotted lines), the pipe sections 143 have two open ends 30 and the center section 142 have one open end 30 and one closed end 31.

The sections 144, 143, 142 of the hydraulic ram 14 comprise sealing means 33, ensuring that the space 20 within an assembled hydraulic ram 14 is sealed so water can only enter or leave the hydraulic ram 14 through the inlet and outlet of the hydraulic rams. The sealing means 33 may also secure the sections, preventing them from sliding apart once they are assembled. Such sealing means 33 may be as illustrated in FIG. 4a or may be any other type of sealing means 33 that the skilled person could think of.

The base section 144 is configured for receiving the first pipe section 143a and the first pipe section 143a is configured for sliding into and out of the base section 144. In the same way, the first pipe section 143a is configured for receiving the second pipe section 143b and the second pipe section 143b is configured for sliding into and out of the first pipe section 143a. The second pipe section 143b is configured for receiving the third pipe section 143c, which is configured for sliding into and out of the second pipe section 143b. The third pipe section 143c is configured for receiving the center section 142 and the center section 142 is configured for sliding into and out of the third pipe section 143c.

The base section further comprise an inlet 21 and an outlet 22. The inlet 21 comprise a valve 22, configured for inletting water into the hydraulic ram 14 when the length of the hydraulic ram 14 is increased. The outlet 24 comprise a valve 25, configured for outletting water from the hydraulic ram 14, when the length of the hydraulic ram 14 is decreased. Theoretically, any of the sections could comprise the inlet 21 and/or the outlet 24.

FIG. 4b illustrates a hydraulic assembled from the sections 144, 143a, 143b, 143c, 142 shown in FIG. 4a. When the hydraulic ram 14 is assembled, together the sections 144, 143a, 143b, 143c, 142 enclose a sealed space 20 with a volume, where water can only enter and leave the hydraulic ram 14 through the inlet 21 and outlet 22.

Figure 5:
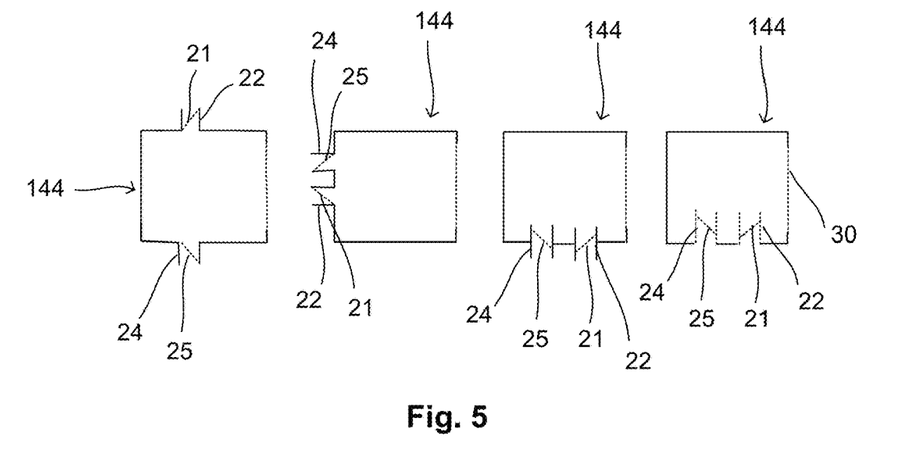

FIG. 5 illustrates different embodiments of the configuration of the inlet 21 and outlet 24 on a base section of a hydraulic ram. If external valves are utilized, the inlet and the outlet may be combined. For clarity, all hydraulic rams 14 of the present invention are fitted with an inlet 21 and/or an outlet 24.

Figure 6:
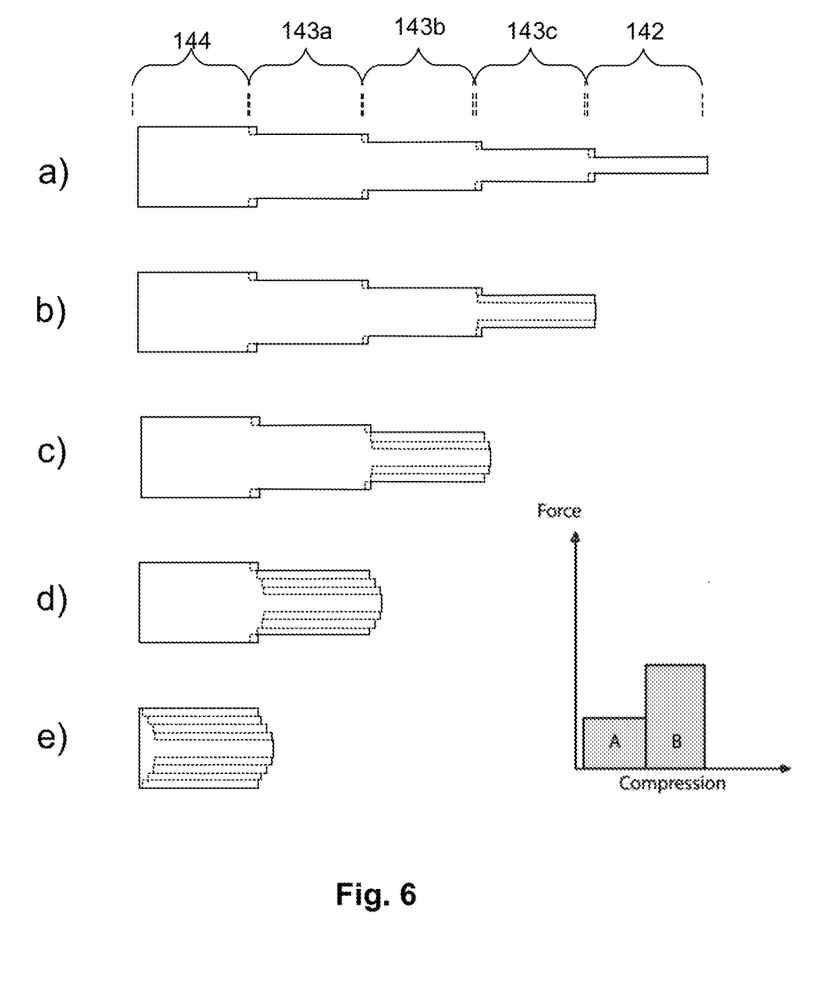

FIG. 6 illustrates an assembled fully extended hydraulic ram with five sections (a), as well as different partly compressed stages (b, c, d, e) of the fully extended hydraulic ram.

A full compression of a fully extended hydraulic ram 14 (a) with five sections, comprise four steps (a to b, b to c, c to d and d to e). In the first step of compression (a to b), the volume within the hydraulic ram 14 decrease, as the center section 142 slides into the third pipe section 143c, whereas the other sections does not move. When the center section 142 cannot slide any further into the third pipe section 143c, the second step of compression (b to c) is initiated and the third 143c pipe section slides into the second pipe section 143b. The force required in the second step of compression is larger than the force required in the first step of compression, as the effective hydraulic area increase. When the third pipe section 143c cannot slide any further into the second pipe section 143b, the third step of compression (c to d) is initiated and the second pipe section 143b slides into the first pipe section 143c. The force required in the third step of compression is larger than the force required in the second step of compression, as the effective hydraulic area increase. When the second pipe section 143b cannot slide any further into the first pipe section 143a, the fourth step of compression (d to e) is initiated and the first pipe section 143a slides into the base section 144. The force required in the fourth step of compression is larger than the force required in the third step of compression, as the effective hydraulic area increase. The force required to compress the hydraulic ram, is provided by wave forces acting on the effector.

In the same way, a full the extension of a fully compressed hydraulic ram (e) comprise four steps (e to d, d to c, c to b and b to a). The force required to extend the hydraulic ram, is provided by wave forces acting on the effector, in the opposite direction, than the wave forces acting on the effector in a way so the hydraulic ram is compressed. To ensure that the hydraulic ram is extended according to the steps described in FIG. 6 the hydraulic ram 14 may further comprise locking means 27.

FIG. 7 illustrates a three-dimensional view of a fully extended hydraulic ram 14 according to different embodiments of the present invention.

Figures 7A, 7B:
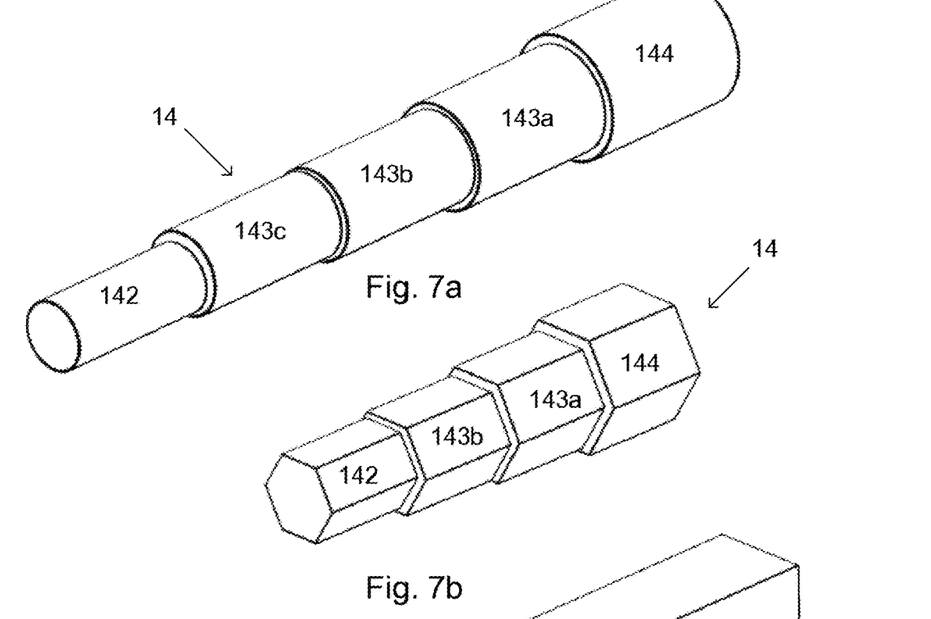
Figure 7C:
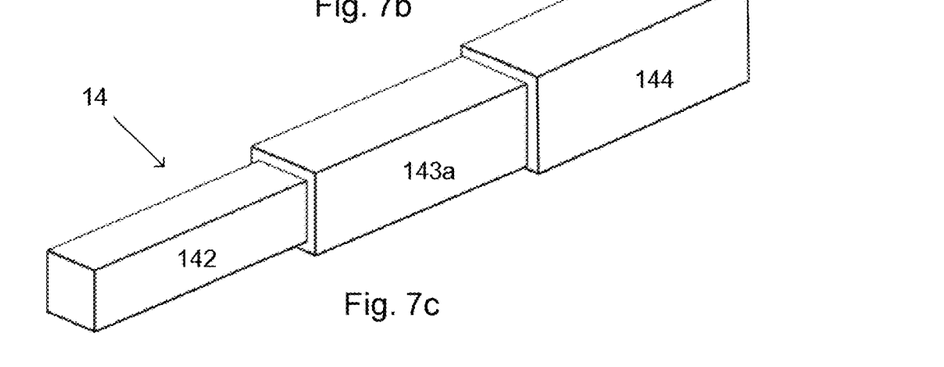

The hydraulic ram 14 illustrated in FIG. 7a comprise five sections 144, 143a, 143b, 143c, 142. Each section is a cylinder having a length and a cross-section. The cylinders in FIG. 7a have a circular cross-section. However, a cylinder of a hydraulic ram 14 according to the present invention may also have a polygonal cross-section, such as a square or a hexagonal cross-section. FIG. 7b illustrates a three-dimensional view of a hydraulic ram 14 with four sections, one base section 144, two pipe sections 143a, 143b and one center section 142, all having a hexagonal cross-section. FIG. 7c illustrates a three-dimensional view of a hydraulic ram 14 with three sections, one base section 144, one pipe sections 143 and one center section 142, all having a square cross-section.

The volume within a fully extended hydraulic ram 14 depends on the number of sections, as well as the length and diameter of each section, which can be varied dependent on the desired use.

Figure 8A:
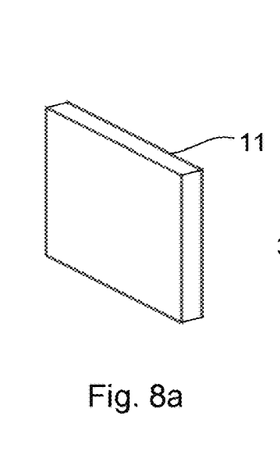
Figure 8B:
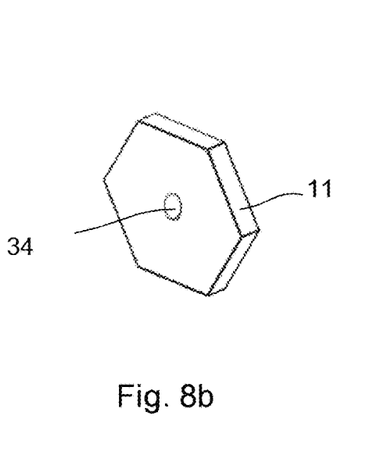
Figure 8C:
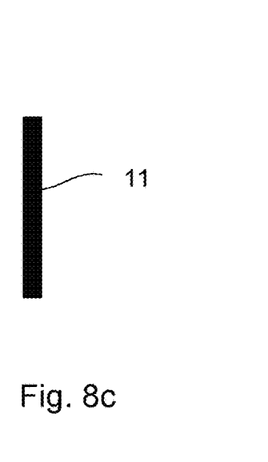

FIG. 8 schematically illustrates a three-dimensional view of an effector 11 according to different embodiments of the present invention. FIG. 8a illustrates an embodiment of an effector 11, having a square plate-like structure. However, the effector 11 may have any other form, such as circular or any polygonal forms, such as hexagonal. The important thing is that the effector 11 have a surface area whereon waves can act with a force sufficiently to move the effector 11. FIG. 8b illustrates an embodiments of an effector 11 configured for being penetrated by the substantially stationary member 2. The effector 11 have a hexagonal plate-like structure and have a hole 34 extending through the effector 11, in the middle of the effector. In this way, the effector 11 can move relative to the substantially stationary member 2, like a pearl on a string, when wave forces are acting on the effector 11. FIG. 8c illustrates a side view of an effector 11 according to the present invention. This side-view is used throughout the figures, to illustrate an effector 11.

Figure 9A:
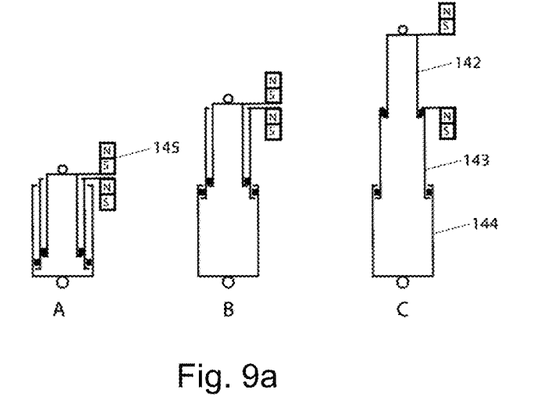
Figure 9B:
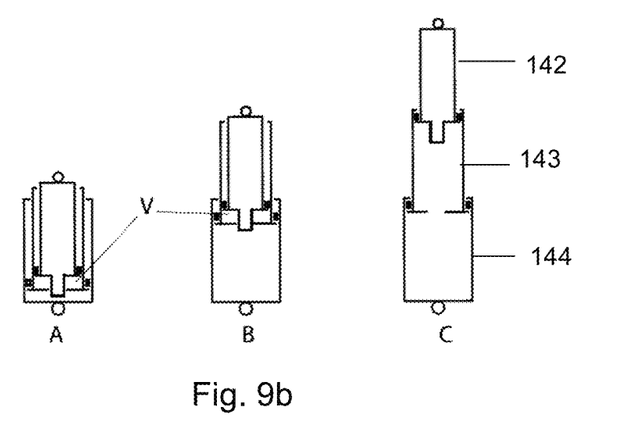
Figure 9C:
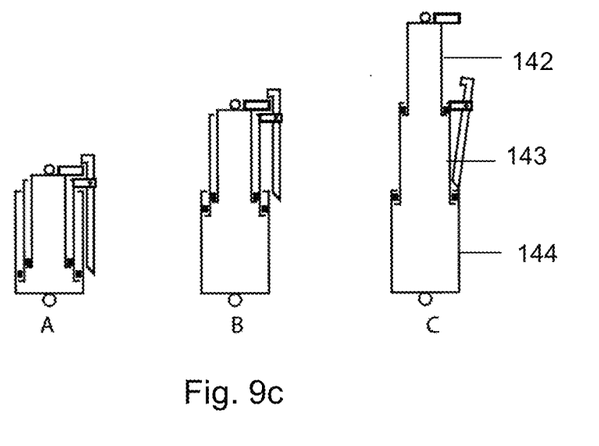

FIG. 9 illustrates different locking means 27 which may be used with a hydraulic ram 14 according to the present invention. Such locking means 27 may for example be magnetic (FIG. 9a), hydraulic (FIG. 9b), mechanical (FIG. 9c) or a combination thereof. FIG. 9a illustrates the expansion sequence for a hydraulic ram fitted with magnetic locking means 27. The advantage of the magnetic locking mechanism is, that the expansion sequence can be controlled such that the largest available pipe section is always fully expanded before the next section is activated. In FIG. 9b is shown the expansion sequence similar to that shown in FIG. 9a, albeit realized using hydraulic locking means 27. In FIG. 9b it is noted that the pipe section is fitted with a bulkhead, said bulkhead having a centered hole. Furthermore, the center section 142 is fitted with an extrusion which fits into the hole of the bulkhead. When the hydraulic ram is completely compressed, the center section 142 extrusion blocks the hole in the bulkhead, hereby sealing off the volume depicted V. As the center section 142 is pulled away from the base section 144, the motion will expand the volume V slightly; hereby reduce the pressure in the volume V and create a resulting pressure difference over the bulkhead. This pressure difference will result in a force acting on the bulkhead, pushing the bulkhead, and hereby the entire pipe section towards the center section 142. This will effectively lock the center section 142 to the pipe section 143. Pipe section 143 and center section 142 will move together, until the pipe section 143 reaches maximum extension. At this point the center section 142 continues its movement until the extrusion on the centerpiece is extracted from the hole in the bulkhead whereupon the under pressure in the volume V is released. The hole in the bulkhead or the extrusion on the centerpiece may comprise means for improved sealing, like seals, rubber lips or elastic coatings. Although the hydraulic locking mechanism in the figures is based on a single hole and a single extrusion, multiple hole/extrusion pairs may in some applications be preferred. Depending on the effectiveness and characteristic of the sealing system, the bulkhead may be mounted with one or more one-way valves releasing overpressure in the volume V during compression of the hydraulic ram. FIG. 9c illustrates an expansion sequence similar to that shown in FIGS. 9a and 9b, albeit realized using mechanical locking means.

Figure 10:
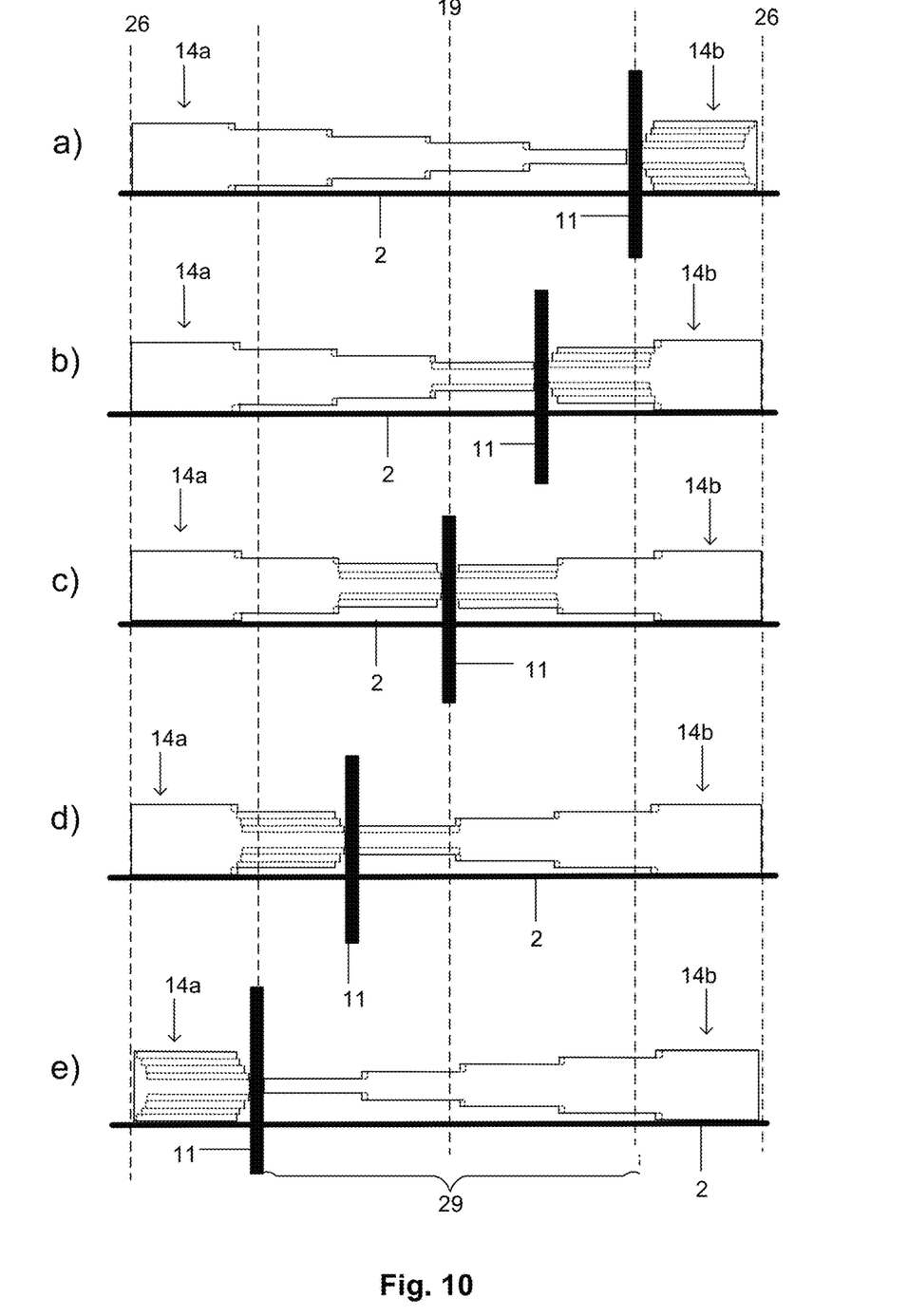

FIG. 10 illustrates a wave power device according to an embodiment of the present invention, where the two hydraulic rams are in different stages of compression. The wave power device in FIGS. 10a, 10b, 10c, 10d and 10e comprise a substantially stationary member 2 and an effector 11 being penetrated by the substantially stationary member 2. The effector 11 is directly connected to two hydraulic rams 14a, 14b, symmetrically positioned around the effector 11. Each effector comprise five sections, one base section 144, three pipe section 143a, 143b, 143c and one center section 142. The base section comprise an inlet and and outlet (Not shown in figure). The effector 11 is directly connected to the center section 144 of each hydraulic ram 14a, 14b, whereas the base section is fixed at a predetermined position 26 on the substationally stationary member 2. In FIG. 10c, the effector 11 is in its center position 19 relative to the substantially stationary member 2 and the two hydraulic rams 14a, 14b are compressed to an extend so that their length is half of their full length minus the length of the base section 144. Thus, the force required to move the effector 11 in one direction is the same as the force required to move the effector 11 in the opposite direction.

When wave forces are acting on the effector 11 in one direction, the effector 11 moves relative to the substantially stationary member. When the effector is moved in one direction, (FIGS. 10c to 10d and 10d to 10e (effector moved to the left)) the effective hydraulic area of one 14a of the two hydraulic rams 14a, 14 is stepwise increased as the moving effector 11 decreases the length of that hydraulic ram 14a and the effective hydraulic area of the other 14b of the two hydraulic rams 14a, 14b is stepwise decreased as the moving effector 11 increases the length 23 of that hydraulic ram 14b. When the effector is moved in the opposite direction (FIGS. 10c to 10b and 10b to 10a (effector moved to the right)), the effective hydraulic area of one 14b of the two hydraulic rams 14a, 14b is stepwise increased as the moving effector 11 decreases the length 23 of that hydraulic ram 14b and the effective hydraulic area of the other 14a of the two hydraulic rams 14a, 14b is stepwise decreased as the moving effector 11 increases the length of that hydraulic ram 14a.

Thus, the force acquired to move the effector, needs to be strong enough to extend one hydraulic ram and compress another. The at least two hydraulic rams have a variable hydraulic area, in a way so that the effective hydraulic area of one hydraulic ram 14 is stepwise increased while the effective hydraulic area of the other hydraulic ram 14 is stepwise decreased, the force required to move one hydraulic ram 14 from its center position 19 towards one of its extreme positions increases as the hydraulic ram 14 moves towards one of the extreme position, while the force acquired to move the effector 11 in the other direction (towards the center position 19) stepwise decreases until the effector is back in its center position. If force is applied in the opposite direction, the same will happen. Thus, the wave power device of the present invention facilitates that the effector 11 returns to the position where the load on the effector 11 is symmetric around its center e.g its center position 19.

The maximum travelling length 29 of the effector 11, is that of the length of one 14a of the two hydraulic rams 14a, 14b, when that hydraulic ram is fully extended, minus the length of the base section of that hydraulic ram.

When the effector move, one of the two hydraulic rams 14a, 14b are compressed, producing pressurized water inside that hydraulic ram, which is pushed through the valve 25 of the outlet 24 and out in the pipe 6. The pressurized water may then flow to a turbine, which convert the pressurized water into energy, such as electric energy (Not shown in figure).

Figures 11, 11C, 11D:
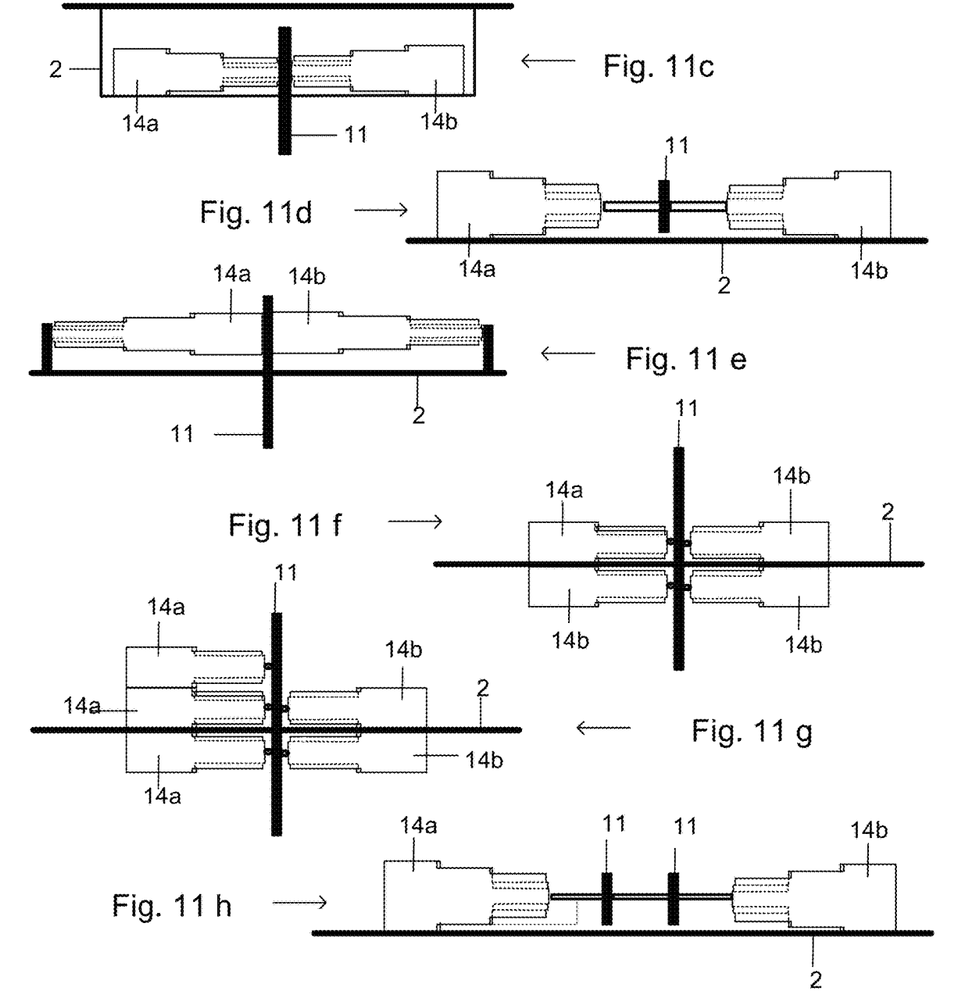

FIG. 11 illustrates different configurations of the effector 11 and the hydraulic rams 14 relative to the substantially stationary member 2 of a wave power device according to the present invention.

Figures 11A, 11B:
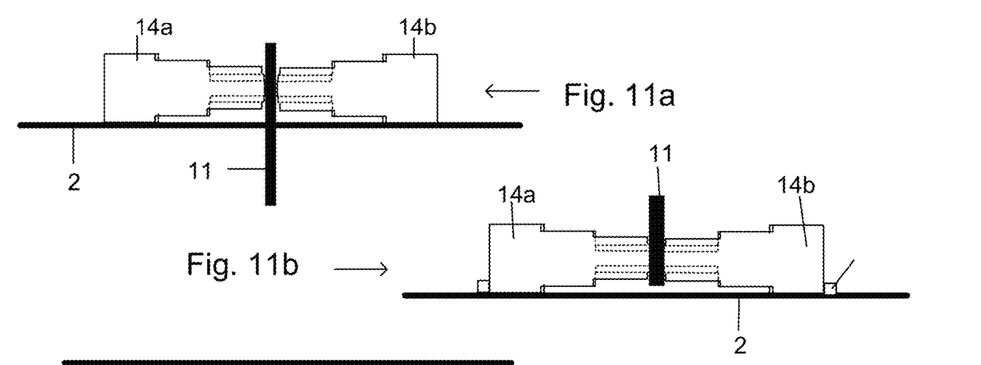

In some embodiments, the effector 11 is directly connected to the center section 142 of the at least two hydraulic rams (FIG. 11a, 11b, 11c).

In some embodiments, the effector 11 is directly connected to the substantially stationary member 2, such as being penetrated by the substantially stationary member 2, preferably in the middle of the effector 11 (FIG. 11a, 11c, 11e, 11f, 11.

In some embodiments, the effector 11 is indirectly connected to the substantially stationary member 2, such as through the two hydraulic rams 14 (FIG. 11b)). In some embodiments, the effector 11 is indirectly connected to the substantially stationary member and the two hydraulic rams, such as through a rigid member connecting the effector with the two hydraulic rams 14a, 14b (FIG. 11, d, 11h).

In some embodiments, the base section 144 of the two hydraulic rams are directly or indirectly connected to the effector 11, while the center section 142 are fixed at a point along the substantially stationary member 2 (FIG. 11e).

In some embodiments, the wave power device comprise more than two hydraulic rams 14 (FIG. 11f, 11g). In some embodiments, more than one effector are indirectly connected to the two hydraulic rams (FIG. 11h). In some embodiments the substantially stationary member is attached a supporting frame attached to a steel cable (11c). Besides of being labor saving, the utilization of a supporting frame is also preferable from a structural point of view, since torque loads as well as transverse loads to the steel cable is minimized.

In general any combination of hydraulic rams of any hydraulic area and configuration of the wave power device can find use according to this invention, as long as at hydraulic rams ensures that the forces on the effector plate grows as the effector moves away from its center position in any one of the possible directions.

Figure 12A:
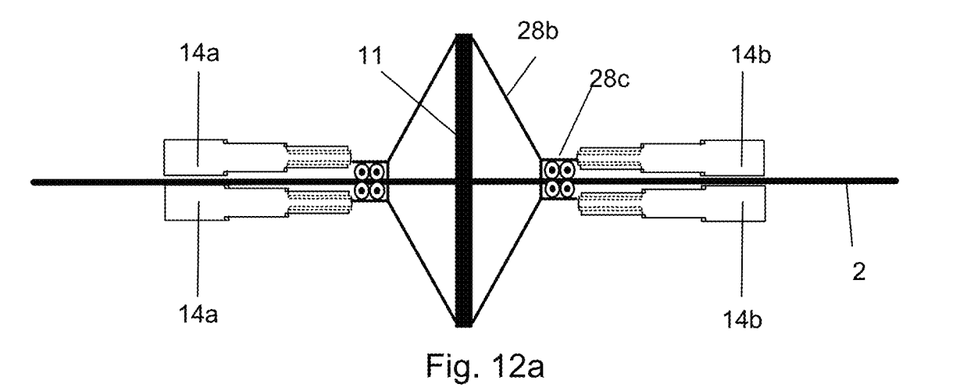
Figure 12B:
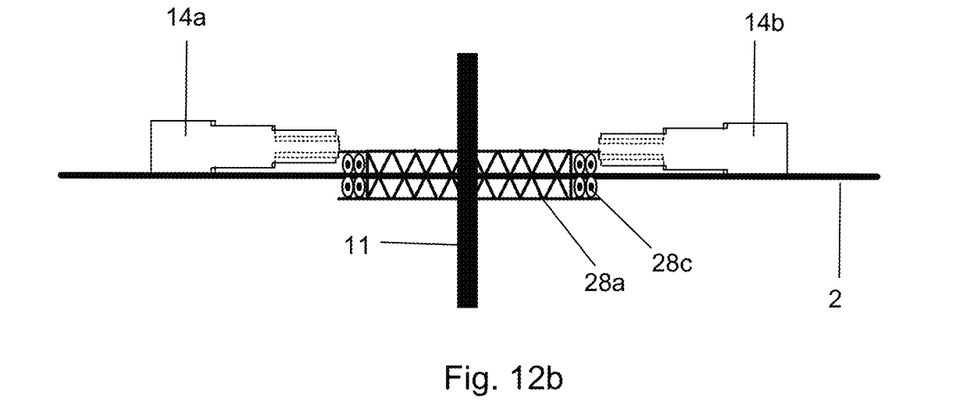

FIG. 12 illustrates two embodiments of a wave power device according to the present invention, wherein the effector is connected to means 28 for stabilizing and easing the movement of the effector. In one embodiment, illustrated in FIG. 12a, the means 28 for stabilizing and easing the movement of the effector comprise rigid metal wires 28b connecting the effector 11 to an element comprising wheels 28c. In another embodiment illustrated in FIG. 12b, the means 28 for stabilizing and easing the movement of the effector comprise an effector-frame 28a and wheels 28c.

Figure 13A:
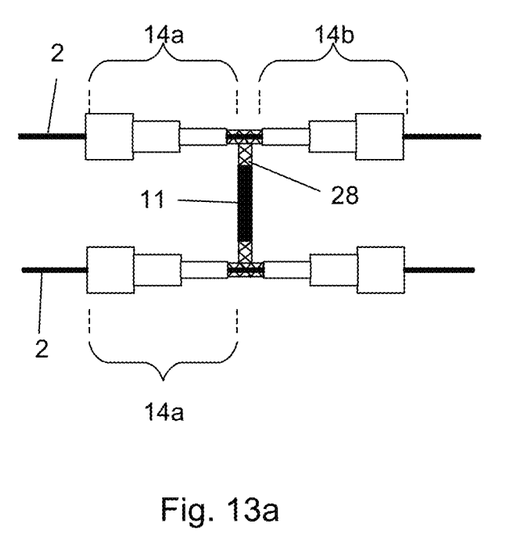
Figure 13B:
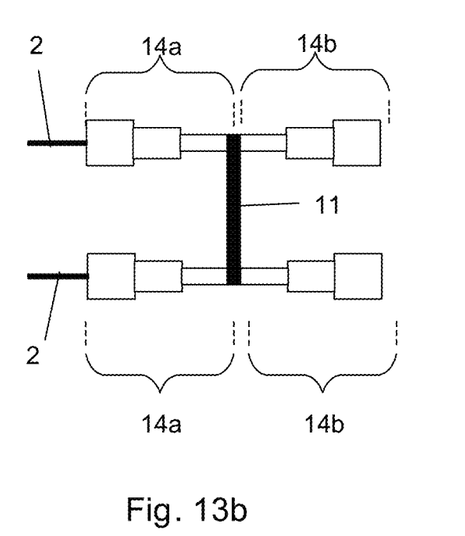

FIG. 13 illustrates an embodiment of a wave power device according to the present invention, where the one effector 11 is directly (FIG. 13a) or indirectly through an effector-frame 28a, connected to two substantially stationary members.

In most figures, the configuration of hydraulic rams 14 are limited to a symmetric arrangement where the effector is loaded with two hydraulic rams mounted symmetrically around the symmetry-line defined by the effector 2. However, many other configurations are equally valid according to this invention.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. In addition, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

LIST OF REFERENCE NUMBERS USED 1 effector module
2 substantially stationary member
3 buoys
4 morring chains
5 anchor
6 pressure pipe
7 turbine
8 main pressure pipe
11 effector
12 effector-frame
13 wheels
14, hydraulic ram
142 center section
143 pipe section
144 base section
15 fixing means
18 length axis of the substantially stationary member
19 effector center position relative to the substantially stationary member
20 sealed space within hydraulic ram
21 inlet in hydraulic ram
22 valve in inlet of hydraulic ram
24 outlet in hydraulic ram
25 valve in outlet of hydraulic ram
26 position on substationally stationary member, where base section is fixed
27 locking means
28 means for stabilizing and easing the movement of the effector
28a effector-frame
28b wires
28c wheels
29 maximum travelling length
30 open end of section of hydraulic ram
31 closed end of section of hydraulic ram
33 sealing means
34 hole in effector, configured for being penetrated

The invention claimed is:

1. A wave power device for extracting energy from water waves, the wave power device comprising:
  a substantially stationary member,
  an effector being directly or indirectly connected to the substantially stationary member and being configured for moving relative to the substantially stationary member when wave forces are acting on the effector, wherein
    the effector is configured to move parallel to a length axis of the substantially stationary member, from a predetermined center position on the substantially stationary member, in either one of two directions being opposite to each other,
  the wave power device further comprises at least two hydraulic rams symmetrically arranged around each effector along the length axis of the substantially stationary member, wherein the at least two hydraulic rams each comprise:
    a base section, at least one pipe section and a center section, wherein the center section is configured for sliding into and out of a pipe section and a pipe section is configured for sliding into and out of the base section, wherein the sections together enclose a sealed space, having a volume which is decreasing or increasing when the sections slide into and out of each other respectively,
    an inlet comprising a valve, for inletting water into the enclosed space within the hydraulic ram, when the length of the hydraulic ram is increasing,
    an outlet comprising a valve, configured for outletting pressurized water from the enclosed space within the hydraulic ram when the length of the hydraulic ram is decreasing,
  wherein the base section or the center section are fixed at a pre-determined position on the substantially stationary member and the other is directly or indirectly connected to the effector, in a way so when the effector moves relative to the substantially stationary member:

the effective hydraulic area of at least one of the at least two hydraulic rams is stepwise increased as the moving effector decreases the length of that hydraulic ram and the effective hydraulic area of at least one of the at least two hydraulic rams is stepwise decreased as the moving effector increases the length of that hydraulic ram wherein the stepwise decrease or increase of the effective hydraulic area of each hydraulic ram, is being controlled by locking means, wherein the locking means are based on magnetic locking means or mechanical locking means or hydraulic locking means or a combination thereof.

2. A wave power device according to claim 1, wherein the sections of each hydraulic ram comprise sealing means, to ensure that no water can flow into or out of the hydraulic ram by other means than through the inlet and outlet respectively.

3. A wave power device according to claim 1, wherein the substantially stationary member is arranged horizontally in the water, in a way so the effector moves along a horizontal length axis, when wave forces are acting on it.

4. A wave power device according to claim 1, wherein the substantially stationary member is kept stationary by at least two mooring chains, wherein each mooring chain is either connected to an anchor or fastened to the bottom surface below the substantially stationery member or fastened to the shore.

5. A wave power device according to claim 1, wherein the substantially stationary member is kept flowing in the water, by at least two buoys.

6. A wave power device according to claim 1, wherein the substantially stationary member is a steel cable or a pressure pipe.

7. A wave power device according to claim 1, wherein the effector is a plate being vertically positioned in the water, perpendicular to the length axis of the substantially stationary member.

8. A wave power device according to claim 1, wherein the effector is being penetrated by the substantially stationary member.

9. A wave power device according to claim 1, wherein the effector is further connected to means for stabilizing and easing the movement of the effector, such as an effector-frame or wires connected to wheels adapted to run on the substantially stationary member, in a way so the effector moves smoothly along a length axis of the substantially stationary member, when wave forces are acting on it.

10. A wave power device according to claim 1, wherein a maximum travelling length of the effector, is that of the length of at least one of the at least-two hydraulic rams, when that hydraulic ram is fully extended, minus the length of the base section of that hydraulic ram.

11. A wave power device according to claim 1, wherein the at least two hydraulic rams are partly compressed when the effector is in its center position and the force required to move the effector in one direction is the same as the force required to move the effector in the opposite direction.

12. A wave power device according to claim 1, wherein the at least two hydraulic rams are compressed to an extent so their length is half of their full length when the effector is in its center position.

13. A wave power device according to claim 1, wherein the outlet of each hydraulic rams is fluidly connected to a pressure pipe, configured for receiving pressurized water when the effectors move.

14. A wave power device according to claim 13, wherein the pressure pipe is connected to a turbine that can convert the pressurized water into energy, such as electric energy.

15. A wave power device for extracting energy from water waves, the wave power device comprising:
a substantially stationary member,
an effector being directly or indirectly connected to the substantially stationary member and being configured for moving relative to the substantially stationary member when wave forces are acting on the effector, wherein
the effector is configured to move parallel to a length axis of the substantially stationary member, from a predetermined center position on the substantially stationary member, in either one of two directions being opposite to each other,
the wave power device further comprises at least two hydraulic rams symmetrically arranged around each effector along the length axis of the substantially stationary member, wherein the at least two hydraulic rams each comprise:
a base section, at least one pipe section and a center section, wherein the center section is configured for sliding into and out of a pipe section and a pipe section is configured for sliding into and out of the base section, wherein the sections together enclose a sealed space, having a volume which is decreasing or increasing when the sections slide into and out of each other respectively,
an inlet comprising a valve, for inletting water into the enclosed space within the hydraulic ram, when the length of the hydraulic ram is increasing,
an outlet comprising a valve, configured for outletting pressurized water from the enclosed space within the hydraulic ram when the length of the hydraulic ram is decreasing,
wherein the base section or the center section are fixed at a pre-determined position on the substantially stationary member and the other is directly or indirectly connected to the effector, in a way so when the effector moves relative to the substantially stationary member:
the effective hydraulic area of at least one of the at least two hydraulic rams is stepwise increased as the moving effector decreases the length of that hydraulic ram, and
the effective hydraulic area of at least one of the at least two hydraulic rams is stepwise decreased as the moving effector increases the length of that hydraulic ram;
wherein the stepwise decrease or increase of the effective hydraulic area of each hydraulic ram is controlled by a locking mechanism between any of said base section, at least one pipe section and center section.

16. A wave power device according to claim 15, wherein the sections of each hydraulic ram comprise sealing means, to ensure that no water can flow into or out of the hydraulic ram by other means than through the inlet and outlet respectively.

17. A wave power device according to claim 15, wherein the substantially stationary member is arranged horizontally in the water, in a way so the effector moves along a horizontal length axis, when wave forces are acting on it.

18. A wave power device according to claim 15, wherein the substantially stationary member is kept stationary by at least two mooring chains, wherein each mooring chain is either connected to an anchor or fastened to the bottom surface below the substantially stationery member or fastened to the shore.

19. A wave power device according to claim 15, wherein the substantially stationary member is kept flowing in the water, by at least two buoys.

20. A wave power device according to claim 15, wherein the effector is being penetrated by the substantially stationary member.

\* \* \* \* \*